United States Patent [19]

Barth

[11] 4,289,271
[45] Sep. 15, 1981

[54] DAMPER CONSTRUCTION FOR A GAS FIRED COMBUSTION APPARATUS

[75] Inventor: James T. Barth, Wisconsin Rapids, Wis.

[73] Assignee: Barth, Inc., Wisconsin Rapids, Wis.

[21] Appl. No.: 56,029

[22] Filed: Jul. 9, 1979

Related U.S. Application Data

[63] Continuation-in-part of Ser. No. 922,780, Jul. 7, 1978, Pat. No. 4,225,080.

[51] Int. Cl.³ .................... G05D 23/00; F23N 3/00
[52] U.S. Cl. .................................. 236/1 G; 431/20
[58] Field of Search ............... 236/1 G, 49, 93 R, 96; 431/20; 110/163

[56] References Cited

U.S. PATENT DOCUMENTS

| | | | |
|---|---|---|---|
| 1,784,608 | 12/1930 | Meyers | 236/93 R |
| 2,184,983 | 12/1939 | Tornquist | 236/1 G X |
| 3,366,333 | 1/1968 | Diehl | 236/93 |
| 4,151,952 | 5/1979 | Edwards | 236/49 |
| 4,204,833 | 5/1980 | Kmetz et al. | 236/1 G X |
| 4,225,080 | 9/1980 | Barth | 236/1 G |

Primary Examiner—William E. Wayner
Assistant Examiner—Harry Tanner
Attorney, Agent, or Firm—Zarley, McKee, Thomte, Voorhees & Sease

[57] ABSTRACT

A thermally controlled damper construction for a gas fired combustion apparatus such as a furnace or the like is described. A damper is pivotally mounted within the stack or flue of the combustion apparatus for pivotal movement from a closed position, wherein the damper is located at an acute angle with respect to the axis of the stack, to a full open position. One edge of the damper is recessed to provide a vent opening between the damper and the stack to permit the venting of gases generated by operation of the pilot light during periods when the furnace is not operating. The damper is pivotally moved between its closed and open positions by a bi-metallic thermally responsive element which is located upstream of the damper and which is connected to the damper by means of a linkage. The linkage includes means for permitting the unrestrained rotational movement of the bi-metallic element after the damper is in its position thereby preventing stressing of the thermally responsive element at high temperatures. An opening is formed in the stack upstream of the damper and substantially immediately below the recessed portion. A temperature responsive safety switch is positioned at the outside surface of the stack outwardly of the opening formed therein and is operably connected to the gas supply of the furnace. In the event the damper does not open when the furnace is operated or an improper draft is present, the products of combustion spill outwardly through the stack opening onto the temperature responsive safety switch thereby activating the same to terminate the gas supply to the furnace.

3 Claims, 6 Drawing Figures

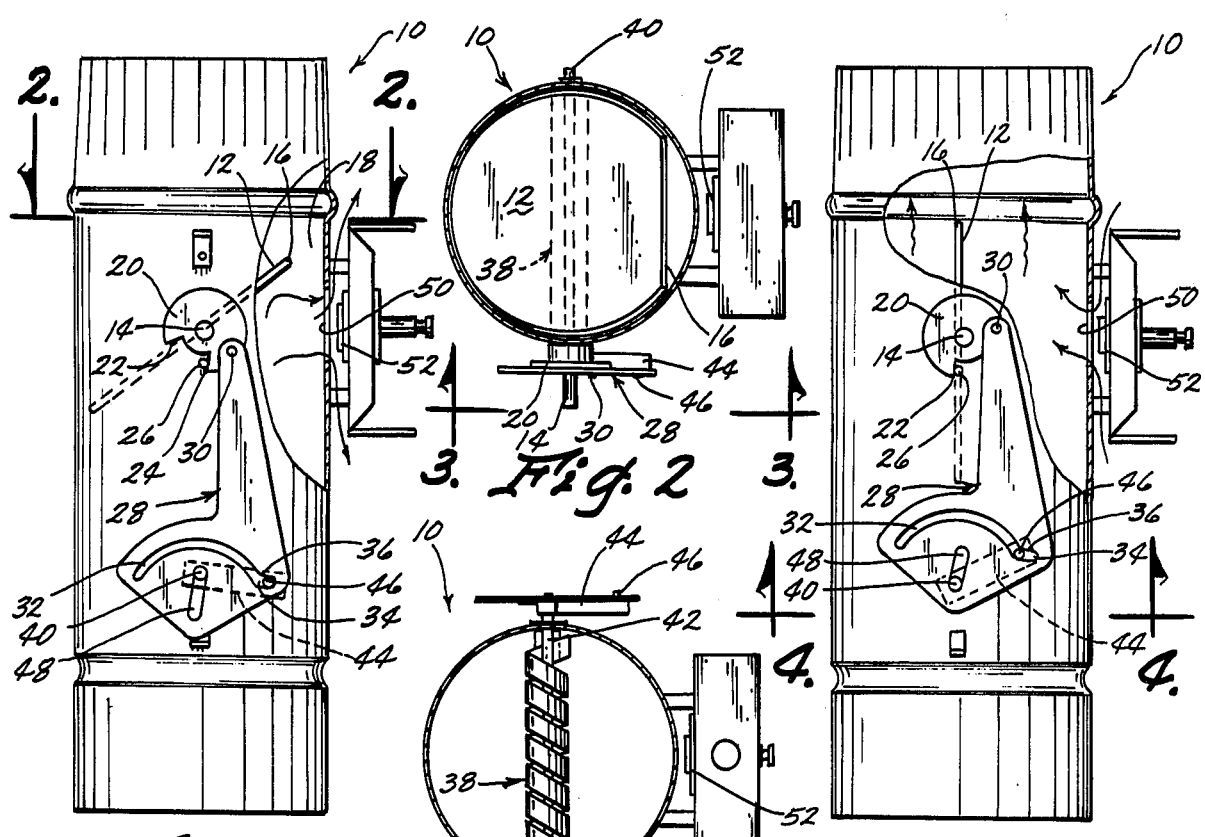
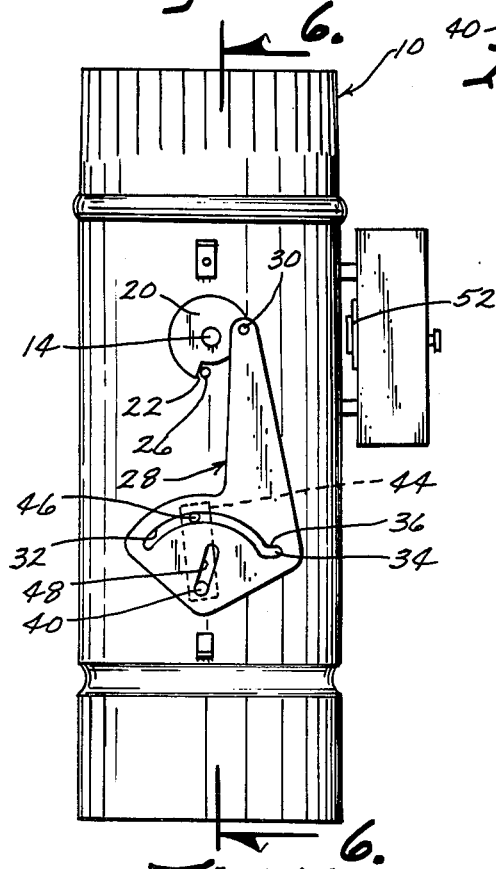
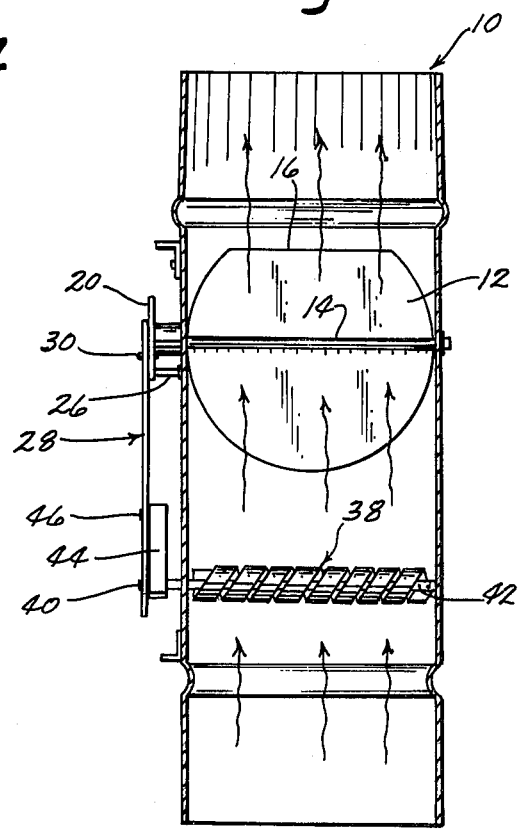

DAMPER CONSTRUCTION FOR A GAS FIRED COMBUSTION APPARATUS

BACKGROUND OF THE INVENTION

This is a continuation-in-part application of my application, Ser. No. 922,780 which was filed on July 7, 1978, U.S. Pat. No. 4,225,080.

Various types of automatic damper control devices have been marketed for use with furnaces, hot water heaters and other heating devices for the purpose of minimizing the loss of heat and conserving fuel. Damper control devices are normally designed to close the flue or stack during periods when the furnace is not operating to prevent the stack heat from being dissipated to the atmosphere and to prevent the loss of conditioned air from the room by convection through the stack. When the furnace is operated, the automatic damper control device will move the damper to an open position to permit flow of the waste gases of combustion to the atmosphere.

In one common form of automatic damper control, the damper is moved between the close and open positions by an electric motor which is operably connected to the room thermostat in the building. When the thermostat calls for heat, the motor is operated to move the damper to the open position. Motor controlled dampers require relatively expensive components, and if the electrical power is shut down, the damper control will be inoperative.

Another type of automatic damper control is a pressure responsive type which is used with oil fired furnaces. As shown in the patent to Scott, U.S. Pat. No. 1,743,731, the pressure of the draft in the flue will open the damper when the motor blower of the furnace is operated. When the operation of the blower is discontinued, the damper will move by gravity to the closed position.

Automatic damper controls have also been constructed utilizing a temperature responsive mechanism, such as a bimetallic element, to control the operation of the damper as disclosed in U.S. Pat. No. 3,366,333.

The apparatus of the co-pending application did represent a significant improvement over the prior art devices, and it is believed that the instant invention represents a significant improvement over the apparatus of the co-pending application. In applicant's earlier invention, it was found that the bi-metallic thermally responsive element was subjected to stress since the bi-metallic element continued to be subjected to rotational forces even though the damper had been pivotally moved to its full open position.

Stack temperatures vary widely from appliance installation to installation. When the temperature responsive safety switch is positioned in the flue as in the co-pending application, the variations in stack temperatures require that the element be adjustable in order to insure action of the safety switch at the proper time for that particular installation.

Therefore, it is a principal object of the invention to provide an improved thermally controlled damper for an exhaust flue of a combustion apparatus such as a furnace, water heater or the like.

A further object of the invention is to provide a thermally controller damper for a gas fired combustion apparatus wherein a temperature responsive safety mechanism is positioned outwardly of an opening formed in the stack so that the switch is surrounded by ambient room air under normal operation conditions thereby eliminating the need for adjusting the sensitivity of the element from one installation to another.

A further object of the invention is to provide a thermally controlled damper for a gas fired combustion apparatus including a linkage which operatively connects the thermally responsive element and the damper which allows the thermally responsive element unrestrained rotational movement after the damper has been moved to its open position.

A further object of the invention is to provide a thermally controlled damper for a gas fired combustion apparatus which is economical of manufacture and durable in use.

These and other objects will be apparent to those skilled in the art.

BRIEF DESCRIPTION OF THE DRAWINGS

FIG. 1 is a side elevation of an exhaust stack incorporating the apparatus of this invention with portions thereof cut away to more fully illustrate the invention;

FIG. 2 is a sectional view taken along lines 2—2 of FIG. 1;

FIG. 3 is a view similar to FIG. 1 except that the damper has been pivotally moved from the closed position of FIG. 1 to the open position;

FIG. 4 is a sectional view taken along lines 4—4 of FIG. 3;

FIG. 5 is a view similar to FIG. 3 illustrating the manner in which the bi-metallic element is permitted unrestrained rotational movement after the damper has been moved to its open position; and FIG. 6 is a sectional view taken on lines 6—6 of FIG. 5.

SUMMARY OF THE INVENTION

The invention relates to an improved thermally controlled damper for an exhaust flue of a combustion apparatus, such as a furnace, water heater or the like. In accordance with the invention, a damper, having a generally elliptical shape, is mounted for pivoting movement within the stack or flue from a closed position, where the damper is located at an acute angle with respect to the axis of the stack, to a full open position where the damper is generally parallel to the stack axis.

Operation of the damper is controlled by a bi-metallic element which is located upstream of the damper and operably connected to the damper shaft by a linkage. When the furnace is operated, the increase in stack temperature will actuate the bi-metallic element to pivot the damper through the linkage from the closed to the open position. The linkage includes means to permit the unrestrained rotational movement of the bi-metallic element after the damper has been moved to the open position.

To provide a vent for the gases of combustion generated by the pilot light when the furnace is not operating, the edge of the damper is recessed to provide a vent opening between the recessed edge and the internal diameter of the stack. The vent opening permits predetermined leakage through the stack sufficient to maintain the pilot light and prevent the buildup of waste gases of combustion resulting from the burning of the pilot light.

The stack is provided with an opening formed therein downstream of the damper and positioned immediately below the recessed portion of the damper. A temperature responsive safety switch mechanism is mounted on the exterior of the stack outwardly of the stack opening and is operably connected to the gas supply for the furnace or the like. In the event the damper is not open for some reason when the appliance is operating or a proper draft is not established for any reason, the products of combustion spill outwardly through the stack opening onto the temperature responsive safety switch thereby actuating the switch to terminate the gas supply to the combustion apparatus preventing spillage of waste gases of combustion through the draft hood into the building.

DESCRIPTION OF THE PREFERRED EMBODIMENT

The numeral 10 refers generally to a stack or flue which is connected to a gas-fired combustion apparatus such as a furnace, hot water heater, space heater or the like. Damper 12 is pivotally mounted within the stack 10 by means of being secured to a shaft 14 which is rotatably mounted in the stack and which extends transversely in respect to the axis of the stack. As seen in the drawings, damper 12 is generally elliptical in configuration and when in the closed position as illustrated in FIG. 1, the damper is positioned at an acute angle with respect to the axis of the stack 10.

A portion of the upper peripheral edge of the damper 12 is cut-away or recessed at 16 to define a vent opening or space 18 between 16 and the interior wall of the stack when the damper is in the closed position as best seen in FIG. 1. The vent opening permits controlled leakage of waste gases of combustion resulting from the burning of the pilot light and prevents the buildup or spillage of the waste gases into the building during periods of non-operation of the furnace burner.

Disc 20 is mounted on the outer end of shaft 14 for rotational movement therewith and is provided with a recessed area defining shoulders 22 and 24 which are adapted to engage the pin 26 extending outwardly from the stack to limit the rotation of the damper.

The numeral 28 refers generally to a linkage or plate which is pivotally connected to the disc 20 at 30 and which extends downwardly therefrom. As seen in the drawings, plate 28 is provided with a first arcuate slot 32 formed therein which communicates with a second slot portion 34 which extends at an angle from one end of the slot 32 thereby defining a shoulder 36 for a purpose to be described in more detail hereinafter.

A thermally responsive member such as a bi-metallic element 38 is positioned within the stack upstream of the damper and is disposed in helical form with one end being connected to the outer end of a central rod 40 while the inner end of the element is connected to a hub 42 attached to the wall of the stack. The outer end of rod 40 extends through the wall of the stack and has a link arm mounted thereon. As seen in the drawings, link arm 44 is mounted at one end to the rod 40 and extends transversely therefrom. Pin 46 is mounted on the other end of the arm 44 and is received by the slots 32 and 34. When the damper is in the closed position of FIG. 1, pin 46 is received within slot portion 34 and engages the shoulder 36 as will be described hereinafter. Plate 28 is also provided with a slot 48 which receives one end of the rod 40.

An opening 50 is formed in the stack upstream of the damper 12 and immediately below the vent opening 18. A temperature responsive manually resettable safety switch 52 is suitably mounted on the exterior surface of the stack and is spaced outwardly from the opening 50. Switch 52 is conventionally connected to the solenoid valve controlling the supply of gas to the furnace so that the switch 52 will terminate the gas supply to the furance when predetermined high temperatures are sensed thereby.

FIG. 1 illustrates the damper 12 in its closed position and it can be seen that pin 46 is received within slot portion 34 and is engaging shoulder 36. The outer end of rod 40 is received by the upper end of the slot 48. When the furnace is not operating, the gases of combustion from the pilot light will pass upwardly through the stack and through the vent opening 18. Assuming that the furnace is then activated, the damper 12 remains in the closed position until the bi-metallic element 38 is subjected to sufficient temperatures so as to begin the opening of the damper 12. In practice, the bi-metallic element 38 is constructed so as to begin opening the damper 12 when the stack temperature is approximately 200° F. and the damper will by fully open at a stack temperature of approximately 200° F. The safety switch 52 is set for a temperature, usually about 260° F., and is manually resettable so that the gas supply to the furnace will not be restored until the switch 52 is manually reset after having been actuated.

As stated, bi-metallic element 38 begins to cause the operation of the damper when the stack temperature has reached approximately 200° F. Rotation of the shaft 40 by the bi-metallic element initially causes the arm 44 to be pivotally moved in a counterclockwise direction as viewed in FIG. 1 so that the pin 46 engages shoulder 36 and creates upward force to the plate 28 which causes the rotation movement of disc 20 and shaft 14 thereby pivotally moving the damper 12 from the closed position of FIG. 1 towards its open position. Pin 46 continues to move the plate 28 upwardly until the damper has reached the open position of FIG. 3 and further rotation of the damper 12 is prevented by means of shoulder 22 on disc 20 engaging pin 26. When the damper has been pivotally moved to the open position of FIG. 3, pin 46 moves out of the slot portion 34 and moves into the arcuate slot 32 thereby permitting the bi-metallic element to have continued unrestrained rotational movement after the damper is in its open position. Without the slot 32, the bi-metallic element would be subjected to considerable stress since stack temperatures may reach 800° F. The continual stressing of the bi-metallic element during the many operational sequences may result in the failure of the bi-metallic element but the linkage means connecting the damper and the bi-metallic element disclosed herein does prevent that stressing and does prevent the failure of the bi-metallic element 38.

As previously stated, the temperature response of safety switch 52 is located on the outside of the stack outwardly of the opening 50 provided in the stack. In the event the damper does not open for some reason when the furnace is operated or a proper draft is not established for any reason, the products of combustion spill outwardly through the opening 50 onto the temperature responsive safety switch 52 thereby actuating the switch to terminate the supply of gas to the furnace burner preventing spillage of waste gases of combustion through the draft hood into the building. Positioning of the switch 52 outwardly of the stack does have many advantages over the installation of the switch within the stack. Stack temperatures vary widely from appliance installation to installation. When the temperature responsive safety switch is placed within the flue, the installation variations require that the responsive temperature of the element be adjustable in order to insure action of the safety switch at the proper time for that particular installation. With the safety switch 52 mounted outside the flue as described herein, the switch is surrounded by ambient room air under normal operating conditions and only in the event or improper draft does the safety switch encounter a temperature higher than normal.

Utilization of the damper control of this invention minimizes dissipation of the stack heat to the atmosphere and prevents convectional loss of heated room air through the stack which can result in fuel savings of up to thirty percent.

Thus it can be seen that the invention accomplishes at least all of its stated objectives.

I claim:

1. A thermally controlled damper for a gas fired combustion apparatus comprising,
   a stack connected to the combustion apparatus and adapted to conduct waste gases of combustion,
   a damper pivotally mounted within the stack and being movable from a closed position to an open position,
   a thermally responsive element disposed in the stack upstream of the damper,
   a linkage means operatively connecting said thermally responsive element and said damper whereby a predetermined increase in temperature in the stack will actuate said thermally responsive element to cause said linkage means to move said damper from the closed position to the open position,
   said stack having an opening formed therein upstream of said damper,
   a temperature responsive safety mechanism positioned outwardly of said stack opening and being spaced therefrom whereby ambient air will pass around said temperature responsive safety mechanism and into said stack opening when sufficient draft exists in said stack and whereby heated gases of combustion will pass outwardly through said stack opening towards said temperature responsive safety mechanism when insufficient draft exists in said stack,
   said temperature responsive safety mechanism being responsive to a predetermined elevated temperture and being operably connected to said combustion apparatus whereby said temperature responsive safety mechanism will cause the operation of the combustion apparatus to be terminated when the temperature of the said safety mechanism senses a predetermined temperature level,
   said stack being substantially vertically disposed and is cylindrical in shape and wherein said damper is elliptical in shape,
   said damper being disposed at an acute angle with respect to the axis of the stack when in its closed position and being generally parallel to the axis of the stack when in its open position,
   said damper having a portion of its upper peripheral edge thereof spaced from the inner wall of the stack when the damper is in its closed position to provide a vent opening therebetween,
   said stack opening being positioned upstream of and generally immediately below said vent opening.

2. In combination,
   a gas fired combustion apparatus,
   a stack connected to the combustion apparatus and adapted to conduct waste gases of combustion,
   a damper pivotally mounted within said stack and being movable from a closed position to an open position, said damper being pivotally mounted in said stack by means of a first shaft which is disposed transversely with respect to the axis of said stack,
   a thermally responsive element disposed in said stack upstream of said damper and including a second shaft which is disposed transversely with respect to the axis of said stack and which is rotated by said thermally responsive element when said thermally responsive element is subjected to temperature changes,
   and a linkage means connecting said first and second shafts whereby rotation of said second shaft by said thermally responsive element will cause said damper to be pivotally moved through said first shaft,
   said linkage means including means for permitting continued unrestrained rotational movement of said second shaft after said damper has been moved to its open position thereby preventing stressing of the thermally responsive element at high temperatures,
   a disc member rigidly mounted on said first shaft outwardly of said stack,
   said linkage means comprising a substantially flat plate having first and second ends, said first end of said plate being pivotally connected to said disc member, said plate being operatively pivotally and slidably secured adjacent its second end, to said second shaft,
   a link arm having opposite ends and being secured at one end to said second shaft outwardly of said stack and extending therefrom, said link arm having a pin means extending transversely therefrom adjacent its other end,
   said plate having a first arcuate slot formed therein which receives said pin means, said plate having a second slot portion formed therein which communicates with one end of said first slot for receiving said pin means at times and which extends at an angle with respect thereto to define a shoulder portion adapted to be engaged by said pin means at times whereby initial rotation of said second shaft during the initial heating of said thermally responsive element will cause said plate to pivotally move said damper to its open position through said disc member and first shaft, the continued rotation of said second shaft, after said damper has reached its open position, causing said pin means to move from said second slot portion into said first slot so that the rotation of said second shaft portion will be unrestrained.

3. The combination of claim 2 wherein said plate has a third slot formed therein which receives said second shaft thereby permitting relative movement between said second shaft and said plate.

* * * * *